United States Patent [19]
Saito

[11] Patent Number: 5,479,272
[45] Date of Patent: Dec. 26, 1995

[54] COLOR GRADATION CORRECTION SYSTEM OF COMBINATION OF LOOKING-UP TABLE AND INTERPOLATION AND METHOD THEREOF

[75] Inventor: Takehiko Saito, Tokyo, Japan

[73] Assignee: Seiko Instruments Inc., Japan

[21] Appl. No.: 106,486

[22] Filed: Aug. 13, 1993

Related U.S. Application Data

[63] Continuation of Ser. No. 17,323, Feb. 11, 1993, abandoned, which is a continuation of Ser. No. 887,413, May 20, 1992, abandoned, which is a continuation of Ser. No. 557,405, Jul. 23, 1990, abandoned.

[30] Foreign Application Priority Data

| Jul. 25, 1989 | [JP] | Japan | 1-193489 |
| Aug. 4, 1989 | [JP] | Japan | 1-203344 |

[51] Int. Cl.⁶ .................. G03F 3/08; H04N 1/46
[52] U.S. Cl. .................. 358/518; 358/521; 358/525; 358/530; 358/537; 364/723; 395/131
[58] Field of Search .................. 358/518, 521, 358/525, 530, 512, 520, 537; 364/723; 395/131

[56] References Cited

U.S. PATENT DOCUMENTS

| 4,275,413 | 6/1981 | Sakamoto et al. | 358/80 |
| 4,334,240 | 6/1982 | Frankin | 358/525 |
| 4,477,833 | 10/1984 | Clark et al. | 358/80 |
| 4,511,989 | 4/1985 | Sakamoto | 364/723 |
| 4,712,141 | 12/1987 | Tomohisa et al. | 358/525 |
| 4,814,867 | 3/1989 | Tsuda et al. | 358/80 |
| 4,839,721 | 6/1989 | Abdulwahab et al. | 358/80 |
| 4,953,012 | 8/1990 | Abe | 358/75 |
| 5,296,920 | 3/1994 | Sakaue et al. | 358/521 |

FOREIGN PATENT DOCUMENTS

| 0273398 | 7/1988 | European Pat. Off. . |
| 2050751 | 1/1981 | United Kingdom . |
| 2053619 | 2/1981 | United Kingdom . |

Primary Examiner—Edward L. Coles, Sr.
Assistant Examiner—Kimberly A. Williams
Attorney, Agent, or Firm—Adams & Wilks

[57] ABSTRACT

A color correction system and method for correcting three kinds of color gradation input data, each having an m bit length, to produce three kinds of corrected color gradation data, each having an m bits length, by a combination of looking-up in a look-up table to find the closest color gradation corrected data and carrying out an interpolation to obtain improved color reproducibility. The system includes a first memory for storing previously calculated color gradation corrected data defined by a combination of upper n bits color gradation data (m>n); a second memory for storing previously obtained coordinate correction data defined by a combination of lower (m–n) bits color gradation data, and outputting first to third coordinate correction data; an adding unit for adding the upper n bits data of the first to third color gradation input data and the first to third coordinate correction data and outputting same to the first memory as a memory address thereof, to cause an output of the stored color gradation corrected data defined by the memory address; and an average calculating unit receiving the color gradation corrected data from the first memory and calculating averages of the three kinds of color gradation corrected data.

21 Claims, 6 Drawing Sheets

FIG. 4a

| LOWER 2BITS | | | $\begin{pmatrix}4C_1\\4M_1\\4Y_1\end{pmatrix}$ | $\begin{pmatrix}4C_1\\4M_1\\4Y_1+4\end{pmatrix}$ | $\begin{pmatrix}4C_1\\4M_1+4\\4Y_1\end{pmatrix}$ | $\begin{pmatrix}4C\\4M_1+4\\4Y_1+4\end{pmatrix}$ | $\begin{pmatrix}4C_1+4\\4M_1\\4Y_1\end{pmatrix}$ | $\begin{pmatrix}4C_1+4\\4M_1\\4Y_1+4\end{pmatrix}$ | $\begin{pmatrix}4C_1+4\\4M_1+4\\4Y_1\end{pmatrix}$ | $\begin{pmatrix}4C_1+4\\4M_1+4\\4Y_1+4\end{pmatrix}$ |
|---|---|---|---|---|---|---|---|---|---|---|
| i | j | k | | | | | | | | |
| 0 | 0 | 0 | 4 | | | | | | | |
| 0 | 0 | 1 | 3 | 1 | | | | | | |
| 0 | 0 | 2 | 2 | 2 | | | | | | |
| 0 | 0 | 3 | 1 | 3 | | | | | | |
| 0 | 1 | 0 | 3 | | 1 | | | | | |
| 0 | 1 | 1 | 3 | | | 1 | | | | |
| 0 | 1 | 2 | 2 | 1 | | 1 | | | | |
| 0 | 1 | 3 | 1 | 2 | | 1 | | | | |
| 0 | 2 | 0 | 2 | | 2 | | | | | |
| 0 | 2 | 1 | 2 | | 1 | 1 | | | | |
| 0 | 2 | 2 | 2 | | | 2 | | | | |
| 0 | 2 | 3 | 1 | 1 | | 2 | | | | |
| 0 | 3 | 0 | 1 | | 3 | | | | | |
| 0 | 3 | 1 | 1 | | 2 | 1 | | | | |
| 0 | 3 | 2 | 1 | | 1 | 2 | | | | |
| 0 | 3 | 3 | 1 | | | 3 | | | | |
| 1 | 0 | 0 | 3 | | | | 1 | | | |
| 1 | 0 | 1 | 3 | | | | | 1 | | |
| 1 | 0 | 2 | 2 | 1 | | | | 1 | | |
| 1 | 0 | 3 | 1 | 2 | | | | 1 | | |
| 1 | 1 | 0 | 3 | | | | | | 1 | |
| 1 | 1 | 1 | 3 | | | | | | | 1 |
| 1 | 1 | 2 | 2 | 1 | | | | | | 1 |
| 1 | 1 | 3 | 1 | 2 | | | | | | 1 |
| 1 | 2 | 0 | 2 | | | 1 | 1 | | | 1 |
| 1 | 2 | 1 | 2 | | | 1 | | | 1 | 1 |
| 1 | 2 | 2 | 2 | | | | | | 1 | 1 |
| 1 | 2 | 3 | 1 | 1 | | | | | 1 | 1 |
| 1 | 3 | 0 | 1 | | | 2 | | | 1 | 1 |
| 1 | 3 | 1 | 1 | | | 2 | | | | 1 |
| 1 | 3 | 2 | 1 | | | 1 | | | | 1 |
| 1 | 3 | 3 | 1 | | | 2 | | | | 1 |

FIG. 4b

| LOWER 2BITS | | | $\begin{pmatrix}4C_1\\4M_1\\4Y_1\end{pmatrix}$ | $\begin{pmatrix}4C_1\\4M_1\\4Y_1+4\end{pmatrix}$ | $\begin{pmatrix}4C_1\\4M_1+4\\4Y_1\end{pmatrix}$ | $\begin{pmatrix}4C_1\\4M_1+4\\4Y_1+4\end{pmatrix}$ | $\begin{pmatrix}4C_1+4\\4M_1\\4Y_1\end{pmatrix}$ | $\begin{pmatrix}4C_1+4\\4M_1\\4Y_1+4\end{pmatrix}$ | $\begin{pmatrix}4C_1+4\\4M_1+4\\4Y_1\end{pmatrix}$ | $\begin{pmatrix}4C_1+4\\4M_1+4\\4Y_1+4\end{pmatrix}$ |
| --- | --- | --- | --- | --- | --- | --- | --- | --- | --- | --- |
| i | j | k | | | | | | | | |
| 2 | 0 | 0 | 2 | | | | 2 | | | |
| 2 | 0 | 1 | 2 | | | | 1 | 1 | | |
| 2 | 0 | 2 | 2 | | | | | 2 | | |
| 2 | 0 | 3 | 1 | 1 | | | | 2 | | |
| 2 | 1 | 0 | 2 | | | | 1 | | 1 | |
| 2 | 1 | 1 | 2 | | | | 1 | | | 1 |
| 2 | 1 | 2 | 2 | | | | | 1 | | 1 |
| 2 | 1 | 3 | 1 | 1 | | | | 1 | | 1 |
| 2 | 2 | 0 | 2 | | | | | | 2 | |
| 2 | 2 | 1 | 2 | | | | | | 1 | 1 |
| 2 | 2 | 2 | 2 | | | | | | | 2 |
| 2 | 2 | 3 | 1 | 1 | | | | | | 2 |
| 2 | 3 | 0 | 1 | | 1 | | | | 2 | |
| 2 | 3 | 1 | 1 | | 1 | | | | 1 | 1 |
| 2 | 3 | 2 | 1 | | 1 | | | | | 2 |
| 2 | 3 | 3 | 1 | | | 1 | | | | 2 |
| 3 | 0 | 0 | 1 | | | | 3 | | | |
| 3 | 0 | 1 | 1 | | | | 2 | 1 | | |
| 3 | 0 | 2 | 1 | | | | 1 | 2 | | |
| 3 | 0 | 3 | 1 | | | | | 3 | | |
| 3 | 1 | 0 | 1 | | | | 2 | | 1 | |
| 3 | 1 | 1 | 1 | | | | 2 | | | 1 |
| 3 | 1 | 2 | 1 | | | | 1 | 1 | | 1 |
| 3 | 1 | 3 | 1 | | | | | 1 | 1 | 1 |
| 3 | 2 | 0 | 1 | | | | 1 | | 2 | |
| 3 | 2 | 1 | 1 | | | | 1 | | 1 | 1 |
| 3 | 2 | 2 | 1 | | | | 1 | | | 2 |
| 3 | 2 | 3 | 1 | | | | | 1 | | 2 |
| 3 | 3 | 0 | 1 | | | | | | 3 | |
| 3 | 3 | 1 | 1 | | | | | | 2 | 1 |
| 3 | 3 | 2 | 1 | | | | | | 1 | 2 |
| 3 | 3 | 3 | 1 | | | | | | | 3 |

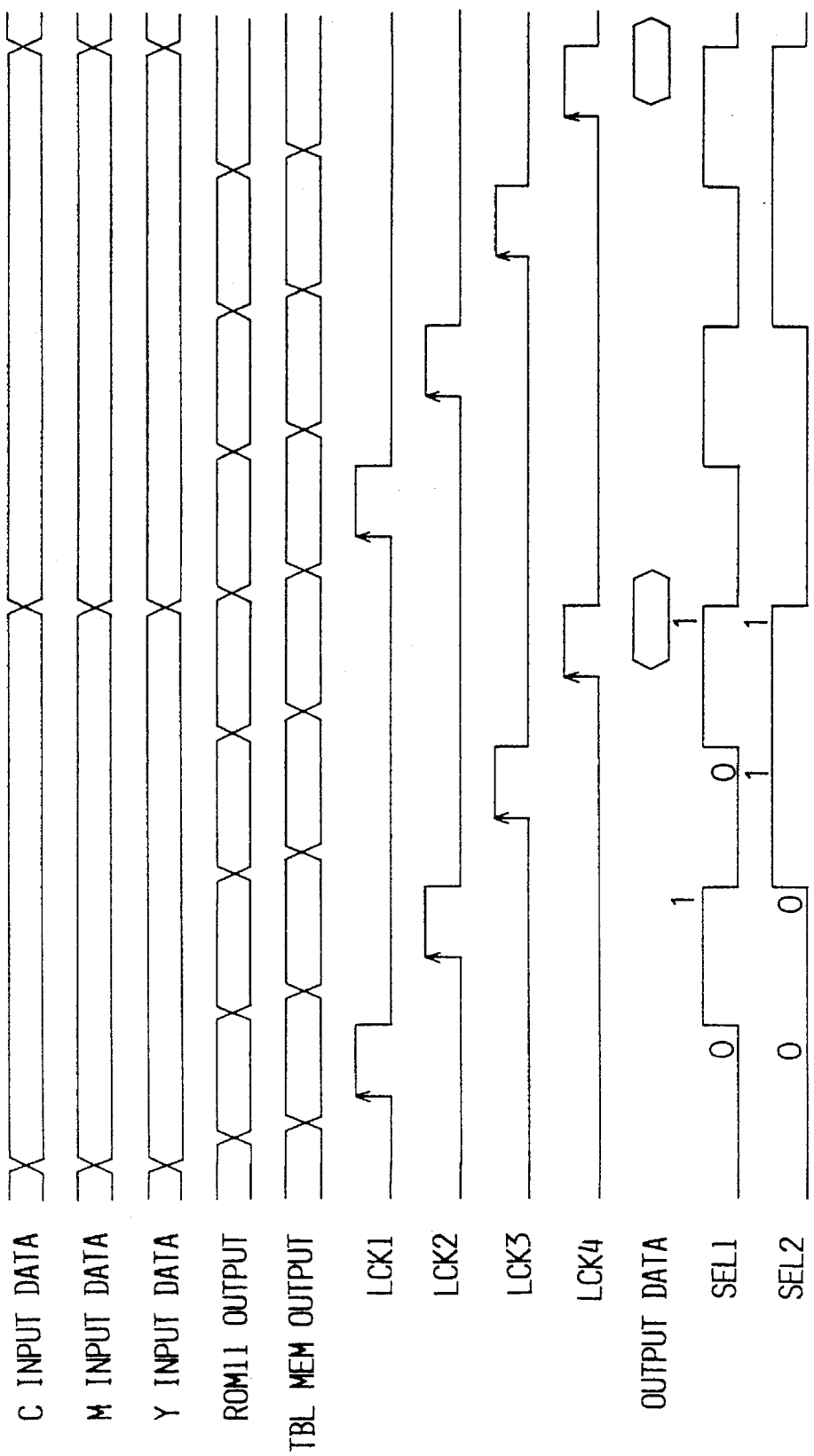

ure system of combination of looking-up table and interpolation and method thereof This is a continuation of application Ser. No. 017,323 filed Feb. 11, 1993, abandoned, which is a continuation application of Ser. No. 887,413 filed May 20, 1992, abandoned, which is a continuation application of Ser. No. 557,405 filed Jul. 23, 1990, abandoned.

BACKGROUND OF THE INVENTION

1. Field of the Invention

The present invention relates to an image processing system employed in, for example, a color printer, a color copy machine, a color display system or the like, for which a high color reproducibility is required, and a method thereof. More particularly, it relates to a color correction system with a relatively small capacity memory for storing color gradation corrected data and carrying out a mix of a looking-up from a look-up table and an interpolation, and a method thereof.

2. Description of the Related Art

In a color correcting method for a color printer or the like, a color masking processing is used. This color masking method corrects three kinds of original color gradation data, i.e., cyan data having a gradation C, magenta data having a gradation M, and yellow data having a gradation Y, supplied the color printer, to three kinds of color gradation corrected data, i.e., corrected cyan data having a gradation C', corrected magenta data having a gradation M' and corrected yellow data having a gradation Y', by using correcting parameters. For example, a first order masking algorithm is expressed by the following formula;

$$\begin{vmatrix} C' \\ M' \\ Y' \end{vmatrix} = \begin{vmatrix} a_{11} & a_{12} & a_{13} \\ a_{21} & a_{22} & a_{23} \\ a_{31} & a_{32} & a_{33} \end{vmatrix} \begin{vmatrix} C \\ M \\ Y \end{vmatrix} \quad (1)$$

where, $a_{11}$ to $a_{33}$ denote correcting parameters.

A second order masking algorithm is expressed by the following formula.

$$\begin{vmatrix} C' \\ M' \\ Y' \end{vmatrix} = \begin{vmatrix} a_{11}\ a_{12}\ a_{13}\ a_{14}\ a_{15}\ a_{16}\ a_{17}\ a_{18}\ a_{19} \\ a_{21}\ a_{22}\ a_{23}\ a_{24}\ a_{25}\ a_{26}\ a_{27}\ a_{28}\ a_{29} \\ a_{31}\ a_{32}\ a_{33}\ a_{34}\ a_{35}\ a_{36}\ a_{37}\ a_{38}\ a_{39} \end{vmatrix} \begin{vmatrix} C \\ M \\ Y \\ C^2 \\ M^2 \\ Y^2 \\ CM \\ MY \\ YC \end{vmatrix} \quad (2)$$

where, $C^2$, $M^2$ and $Y^2$ denote self products of the gradation of each three color, cyan, magenta and yellow input data, CM, MY and CY denote mutual products among three color cyan, magenta and yellow input data, and $a_{11}$ to $a_{39}$ denote correction parameters.

A set of the three kinds of color gradation input data (C,M,Y) is previously calculated by the above masking formula (1) or (2) as a set of three kinds of color gradation corrected output data (C',M',Y').

As a prior method of color correction, a method is known wherein the color gradation corrected output data (C',M',Y') for all combinations of all color gradation data (C,M,Y) are previously calculated in accordance with the formula (1) or (2) and stored in a table memory, and a output of the color gradation corrected output data corresponding to the color gradation input data (C,M,Y) is carried out by a look-up in a look-up table. This method, however, requires a memory having a large capacity, for storing all of the previously calculated color corrected gradation data (C',M',Y') and thus suffers from a disadvantage of a bulky system and high cost. For example, when each color gradation is expressed by eight bits (one byte), to represent 0 to 255 gradations, the capacity of the table memory is $2^{24} \times 3$ bytes (48 M bytes or 384 M bits).

To overcome the disadvantage set forth above, Japanese Examined Patent Publication (kokoku) No. 52-16493 discloses an apparatus in which, to reduce the size of the table memory, only a part of three kinds of color gradation corrected data previously obtained by the above-mentioned formula and used for looking-up in a look-up table is stored in the table memory, the remaining color correcting gradation data are not stored in the table memory, and the interpolation is carried out.

In the above-mentioned combination of looking-up in a look-up table and carrying out an interpolation method, the interpolation is carried out independently for each kind of color gradation. For example, when a cyan gradation corrected output data C' is to be obtained, the output data C' is interpolated between adjoining previously calculated cyan gradation corrected output data, as an intermediate data, i.e., an average of the adjoining cyan gradation correction output data. Specifically, first, the looking-up in the look-up table is carried out to find a set of previously calculated color gradation corrected data $(C_r, M_r, Y_r)$ positioned at the nearest coordinate position to the input gradation coordinate (C,M,Y), and another adjacent set of color gradation corrected data $(C_{r+1}, M_{r+1}, Y_{r+1})$, and second, a one-dimensional interpolation of the cyan gradation data C is carried out for only the cyan, on the basis of the relationship among C, $C_r$, $C_{r+1}$. Namely, to interpolate the cyan element, the relationship of the magenta and yellow gradation data is not considered. Accordingly, when the input magenta gradation data M satisfies $M_r < M < M_{r+1}$ and the input yellow gradation data Y satisfies $Y_r < Y < Y_{r+1}$, the color gradation corrected data are equal. This also applies when obtaining other color gradation corrected data, i.e., magenta and yellow gradation corrected data M' and Y'. Namely, the method discussed above suffers from a disadvantage of a low accuracy color reproducibility. In addition, multiplying circuits are required for calculating, for example, where C is located at a position between $C_r$ and $C_{r+1}$, and thus the cost thereof becomes high.

The above problems can occur in other systems, for example, a color display system in which a correction for gradations of three kinds of fundamental light elements, i.e., red, green and blue, is required.

SUMMARY OF THE INVENTION

An object of the present invention is to provide a color correction system having a relatively small capacity memory for storing previously calculated color gradation corrected data, providing an improved color reproducibility, and enabling a compact circuit construction.

Another object of the present invention is to provide a method of correcting a color gradation employed in the system.

According to the present invention, there is provided a color correction system for correcting three kinds of color gradation input data, each having an m bit length, to produce three kinds of corrected color gradation data each having an m bits length, by looking-up in a look-up table to find the closest color gradation corrected data and then carrying out an interpolation to obtain the three kinds of corrected color gradation data at an improved color reproducibility. The system includes a first memory unit for storing previously calculated color gradation corrected data arranged in a three-dimensional coordinate space and defined by a combination of upper n bits color gradation data, where m is greater than n; a second memory unit for storing previously obtained coordinate correction data defined by a combination of lower (m–n) bits color gradation data, receiving the lower (m–n) bits color gradation data, and outputting first to third coordinate correction data, an adding unit for adding the upper n bits data of the first to third color gradation input data and the first to third coordinate correction data output from the second memory unit and outputting same to the first memory unit as a memory address(es) thereof, to cause an output of the stored color gradation corrected data defined by the memory address, and an average calculating unit receiving the color gradation corrected data from the first memory unit and calculating averages of the three kinds of color gradation corrected data.

Preferably, the second memory unit consecutively outputs the first to third coordinate correction data in response to first to third timings. the adding unit consecutively receives and adds the upper n bits data of the first to third color gradation input data and the first to third coordinate correction data and consecutively outputs same to the first memory unit as a memory address(es) thereof, to consecutively cause the output of the stored color gradation corrected data, and the average calculating unit consecutively receives the color gradation corrected data and calculates the averages in response to first to third timings different to the above first to third timings.

The first memory unit has a capacity of at least $2^{3 \times n} \times 3$ bytes, and the second memory means has a capacity of at least $2^{(m-n) \times 3}$ bytes, and the interpolation is carried out by considering a mutual relationship among the three kinds of color gradation data.

The three kinds of color gradation data dealt with in this specification are cyan, magenta and yellow, which are three fundamental color elements, respectively, or red, green and blue, which are three fundamental light elements, respectively.

According to the present invention, there is also provided a method of correcting three kinds of color gradation input data, each having an m bit length, to produce three kinds of corrected color gradation data, each having an m bits length, including the steps of: (a) previously calculating corrected color gradation data arranged in a three-dimensional coordinate in accordance with a combination of upper n bits color gradation data, where m is greater than n, and coordinate correction data in accordance with lower (m–n) bits color gradation data; (b) consecutively obtaining first to third previously calculated coordinate correction data on the basis of the lower color gradation data, in response to first to third operation timings; (c) consecutively adding the upper n bits data of the first to third color gradation input data and the obtained first to third coordinate correction data; (d) consecutively outputting the previously calculated color gradation corrected data defined by the first to third corrected coordinates; and (e) calculating averages of the consecutively output color gradation corrected data.

BRIEF DESCRIPTION OF THE DRAWINGS

Other objects and features of the present invention will be described in more detail with reference to the accompanying drawings, in which

FIGS. 4a and 4b are views showing the contents of selection tables stored in a ROM in FIG. 1; and FIG. 5 is a timing chart of the operation of the color gradation correction system shown in FIG. 1.

DESCRIPTION OF THE PREFERRED EMBODIMENTS

Figure 1:
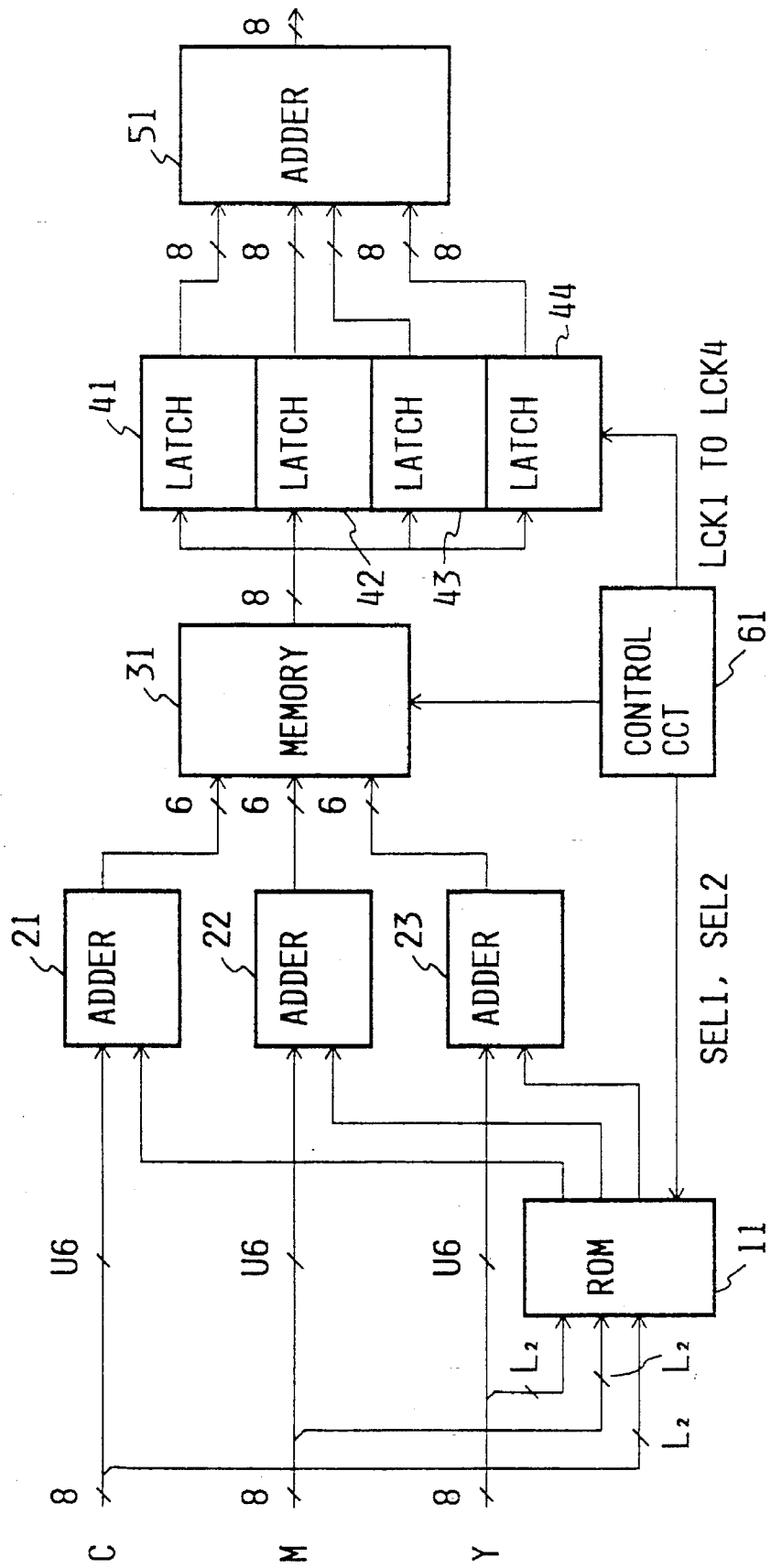
FIG. 1 is a block diagram of an embodiment of a color correction system according to the present invention.

FIG. 1 is a block diagram of an embodiment of a color gradation correction system according to the present invention.

Figure 2:
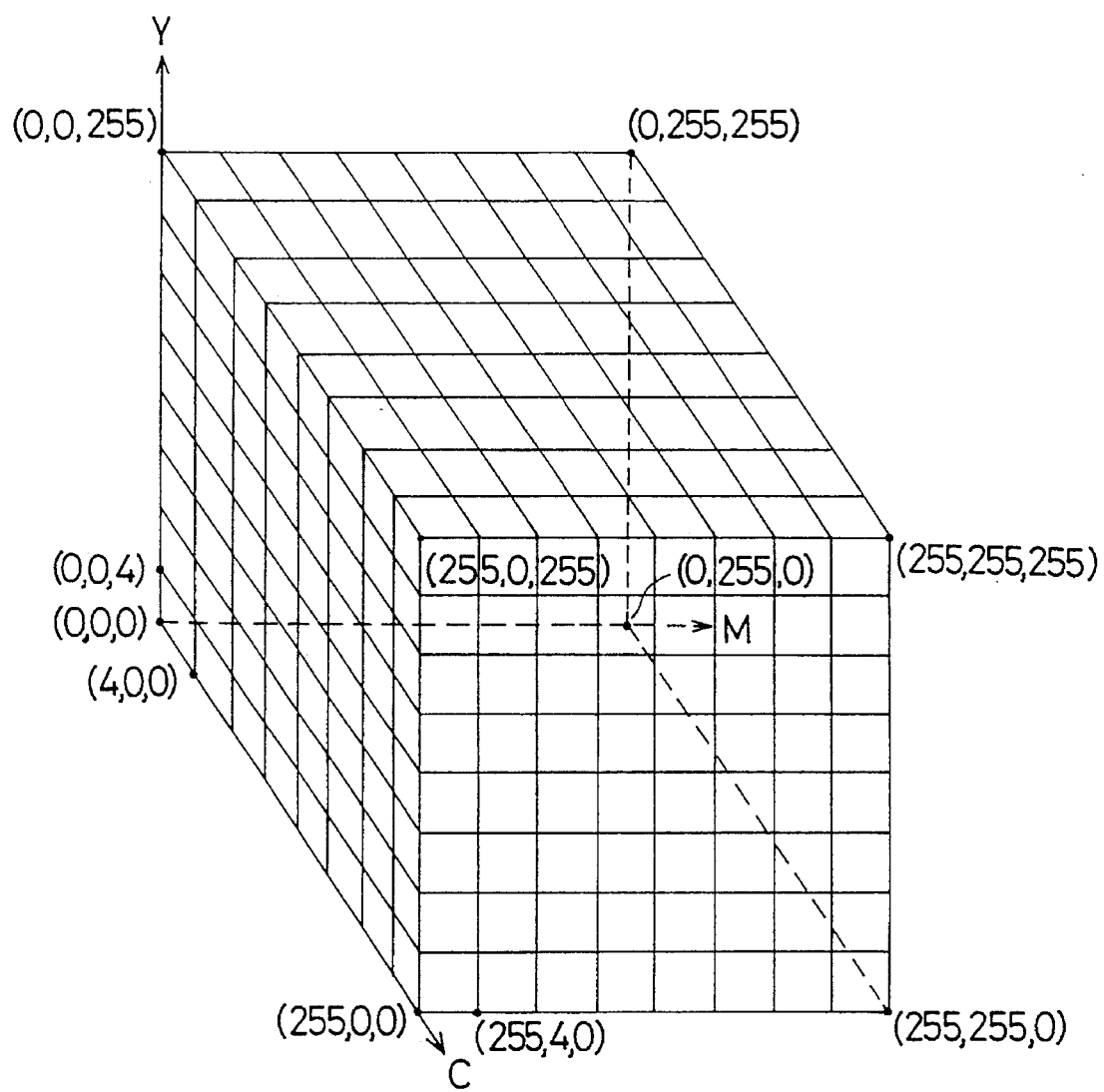
FIG. 2 is a view showing spatial coordinates of three color gradation corrected data.
Figure 3:
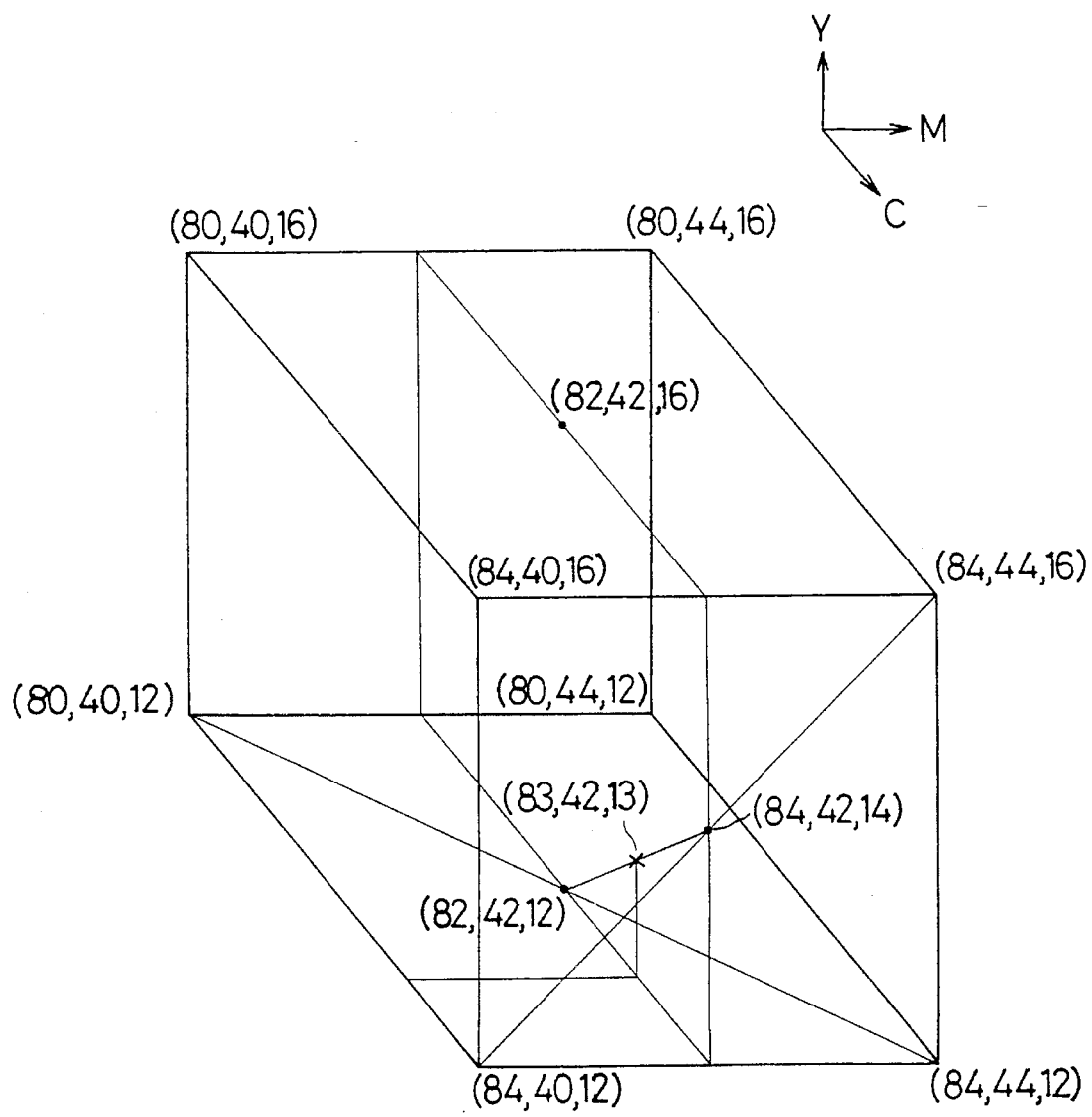
FIG. 3 is an enlarged view of a part of the spatial coordinates illustrated in FIG. 3 as an example.

The color gradation system includes a selection data table memory 11 constructed by a read-only-memory (ROM) and storing the selection tables shown in FIGS. 4a and 4b; three adders 21 to 23; a color correction data table memory 31 constructed by a ROM and storing previously calculated color gradation corrected data illustrated in FIGS. 2 and 3; four latch circuits 41 to 44 such as registers for holding data output from the table memory 31; an adder 51 for calculating an average of data held at the latch circuits 41 to 44; and a control circuit 61 operatively connected to and controlling the selection data table memory 11, the color correction data table memory 31, and the latch circuits 41 to 44.

In the embodiment of the present invention, each color gradation input data C, M and Y is expressed by eight bits, i.e., the color gradation data is expressed between 0 and 255. The upper six bits of each color gradation input data are input to the corresponding adders 21 to 23, and the lower two bits are input to the selection data table memory 11; i.e., in the embodiment of the present invention m=8 and n=6. Further, in this embodiment of the present invention, the selection data of a combination defined by three lower two bits is stored in the selection data table memory 11, and the color gradation corrected data of a combination defined by three upper six bits is stored in the color corrected data table memory 31. FIG. 2 is a view showing the three kinds of color gradation corrected data previously calculated in accordance with, for example, the above formula (2), and arranged in a three-dimensional coordinate system. Note that the distance of each cubicle is four gradations, and consequently, the number of blocks in each direction is eight, to thereby express gradations 0 to 255.

In the prior art, the total memory size was $2^{24} \times 3$ bytes, conversely, in the embodiment of the present invention, the total memory size is $2^{19} \times 3$ bytes for the color gradation corrected data table memory 31 and $2^{3 \times 3}$ bytes for the selection data table memory 11. Therefore, compared with the prior art, the total memory size is reduced to approximately 1/64.

An interpolation algorithm of the embodiment according to the present invention will be described. When each color gradation input data has an eight bits (0 to 255 gradations) length, and is divided into upper six bits (0 to 63) and lower two bits (0 to 3), the color gradations of the input data C, M, and Y can be expressed by the following equations, respectively:

$C=4C_1+i(C_1:0-63, i:0-3)$ $M=4M_1+j(M_1:0-63, j:0-3)$ $Y=4Y_1+k(Y_1:0-63, k:0-3)$ where, $C_1$, $M_1$ and $Y_1$ denote values (0 to 63) expressed by the upper six bits, i, j and k denote indices (0 to 3) expressed by the lower two bits, and 4 is the maximum number expressed by i, j an k, respectively.

As described above, the values $C_1$, $M_1$ and $Y_1$ defined by the upper six bits can be used for designating a three-dimensional location of the color gradation corrected data stored in the table memory 31, as shown in FIG. 2. Alternatively, the indices i, j and k are used for correcting the three dimensional location to find the nearest color gradation corrected data in the table memory 31.

When any combination of C, M and Y under i=j=k=0, a correct color gradation to be positioned at lattice portions where the previously calculated color gradation data is stored in the table memory 31, is found. Therefore, in these cases, an interpolation is not necessary. Under other conditions of the indices i, j and k, the correction of the spatial coordinates for finding the closest color gradation corrected data is necessary, and the interpolation is also necessary.

An example of correcting the location where the closest color gradation corrected data is stored, and the interpolation will be now described.

FIG. 3 shows a specific example of the three dimensional spatial arrangement when the color gradation input data (C,M,Y)=(80,40,12) and (C,M,Y)=(84,44,16). FIG. 3 is an enlarged view of a part of FIG. 2.

When the indices i, j and k are 2, respectively, a set of color gradation corrected data in a spatial location defined by C=4($C_1$+1), M=4($M_1$+1) and Y=4($Y_1$+1) and another set of color gradation corrected data in another spatial location at i=j=k=0, are selected, and an intermediate value between the data in the above locations is calculated. For example, when (C,M,Y)=(82,42,16), the color gradation corrected data positioned in a lattice (80,40,16) and the color gradation corrected data positioned in another lattice (84,44,16) are selected and read out from the table memory 31, and the read data is interpolated to obtain a final color gradation corrected value.

Also, when the indices i, j and k are 1, respectively, an intermediate value between a set of previously calculated color gradation corrected data when the indices i, j and k are 2, and another set of previously calculated color gradation corrected data when the indices i=j=k=1, is calculated.

Further, when the indices i, j and k are 3, respectively, an intermediate value between a set of previously calculated color gradation corrected data where C=4($C_1$+1), M=4($M_1$+1) and Y=4($Y_1$+1), and another set of the previously calculated color gradation corrected data when the indices i, j and k are 2, respectively, is calculated. For example, when a set of input data (C,M,Y) is (83,42,13), the location of the input data can be expressed as follows:

(4×20+3, 4×10+2, 4×3+1)

First, the processing from the condition of i=j=k=1 to the condition of i=j=k=3 is carried out. Namely, the following intermediate values are calculated.

(4×20+2, 4×10+2, 4×3)           (a)

(4×21, 4×10+2, 4×3+2)           (b)

Next, the processing when i=j=k=2 is carried out as follows. First, the value of (a) is obtained, i.e., reading a set of data at a lattice location (80,40,12) and another set of data at another lattice location (84,44,12), and thereafter, the value of (b) is obtained by data at a location (84,40,12) and another data at a location (84,44,16). A set of intermediate values between the data set (a) and the data set (b) is calculated to obtain the color gradation corrected value for the input data (83,42,13).

When m=n=2, and i=j=k=1 or 3, the calculations for obtaining the intermediate value must be carried out three times, and the data of four lattice locations surrounding the input data position must be read up to four times. Assuming that the four set data read from four lattice locations are represented as A, B, C and D, a color gradation corrected data E to be obtained is expressed by the following formula;

$$E = \frac{1}{2}\left(\frac{1}{2}(A+B)+\frac{1}{2}(C+D)\right)$$
$$= \frac{1}{4}(A+B+C+D)$$

This means that an average of the four data is calculated as the final interpolated data, i.e., the final color gradation corrected data.

In the embodiment of the present invention, to facilitate the data handling, the color gradation correction system and method thereof, wherein an unconditional looking-up of the look-up table is carried out four times and the average calculation of the four-times read data is carried out against the combination of all of the indices i, j and k, is realized. Even if i=j=k=0, as described above, the look-up table is looked-up four times.

FIGS. 4a and 4b are views showing the combination of the indices i, j and k, and how the correction of the spatial location is carried out to find the most relevant color gradation corrected data and how much data is read from the table memory 31, should be made. For example, when the indices (i,j,k)=(0,3,1), data sets of (4$C_1$, 4$M_1$, 4$Y_1$) and (4$C_1$,4$M_1$+4,4$Y_1$+4) are read one time and a data set (4$C_1$, 4$M_1$+4,4$Y_1$) is read twice to obtain four sets of data to be used in the interpolation.

In FIG. 1, the selection table memory 11 stores data of logical "0" for selecting 4$C_1$,4$M_1$ or 4$Y_1$, and data of logical "1" for selecting 4$C_1$+4, 4$M_1$+4 or 4$Y_1$+4.

FIG. 5 is a timing chart of the operation of the color correction system shown in FIG. 1, in accordance with the algorithm and the data processing discussed above. The operation for obtaining C' from the input data (C,M,Y) will be described with reference to FIGS. 1 and 5.

The upper six bits of the input data C, M and Y, as 4$C_1$, 4$M_1$ and 4$Y_1$, are input to the adders 21 to 23, and the lower two bits of the input data C, M and Y, as the indices i, j and k, are input to the selection table memory 11. These lower two bits function as address of the memory 11. The control circuit 61 outputs selection signals SEL1 and SEL2, and combination of the selection signals SEL1 and SEL2 defines the access number to the memory 11, i.e., the number thereof being 0 when SEL1=0 (low level) and SEL2=0, 1 when SEL1=1 (high level) and SEL2=0, and so on. When the SEL1 and SEL2 signals from the control circuit 61 are input to the memory 11 as an access signal, three bits of data are output to the corresponding adders 21 to 23 to be added to the corresponding upper bits data $4C_1$, $4M_1$ and $4Y_1$ at the adders 21 to 23, to thereby correct the address location of the memory 31 from which the color gradation corrected data set is read; namely, the output data from the adders 21 to 23 functions as the address of the memory 31.

The data output from the memory 31 is consecutively held in the latch circuits 41 to 44 in response to latch clocks LCK1 to LCK4 output from the control circuit 61, and the adder 51 calculates an average of the data output from the latch circuits 41 to 44 to obtain the interpolated color gradation data C' in accordance with the formula (3).

The color gradation corrected data M' and Y' are obtained in the same way as mentioned above. Note that each color gradation corrected data is obtained by considering the mutual relationship among the three color fundamental elements, and consequently, the color correction according to the embodiment of the present invention provides a high reproducibility of the color gradation corrected results having an accuracy approximately equal to that obtained when all of the color correction results of a combination of eight bits of each color are stored in a table memory, e.g., the memory 31 in the embodiment of the present invention, and as this requires a totally relatively small capacity for the memories 11 and 31 and omits the conventional multiplying circuits, a compact and low cost color gradation correction system is obtained.

The many features and advantages of the present invention are apparent from the detailed description, and thus the appended claims are intended to cover all such features and advantages of the present invention which fall within the true sprit and scope thereof. Further, since numerous modifications and changes will readily occur to those skilled in the art, it is not desired to limit the invention to the exact construction and operation illustrated and described, and accordingly, all suitable modifications and the equivalents thereof may be utilized , as long as they fall within the scope of the invention.

For example, the bit length m of the color gradation input data and/or the color gradation corrected output data can be an arbitrary length. Also, the bit length n of the upper bits of the input data can be an arbitrary length, such as seven or five.

Also, in the above embodiment, the selection data table memory 11 and the color gradation corrected data table memory 31 are separate, but they can be incorporated as one unit. The adders 21 to 23, the latch circuits 41 to 44, the adder 51, and the control circuit 61 also can be realized by a single unit such as a microprocessor or a data signal processor.

Furthermore, the above embodiment refers to the color printer processing of three fundamental colors, cyan, magenta and yellow, but the present invention can apply to other color data processing systems such as a color display system for displaying color images of three fundamental light colors red, green and blue. Accordingly, in the context of the specification, including the attached claims, the fundamental colors involved are cyan, magenta and yellow, and red, green and blue.

What we claim is:

1. A color correction system for correcting three kinds of color gradation input data, each having an m bit length, to produce three corresponding kinds of corrected color gradation data each having an m bit length, comprising: first memory means for storing the most significant n bits of previously calculated color gradation corrected data in a three-dimensional coordinate space, where m is greater than n; second memory means for storing the least significant (m−n) bits of the previously calculated color gradation corrected as coordinate correction data, and outputting coordinate correction data corresponding to the three kinds of color gradation input data, the coordinate correction data being for determining a memory address of the color gradation corrected data in the three-dimensional coordinate space and for determining a number of times the memory address is to be selected; adding means for individually adding for each of the three kinds of color gradation input data the most significant n bits of each type of color gradation input data to the corresponding coordinate correction data output from said second memory means, producing respective added values, and individually outputting the respective added values to the first memory means as respective memory addresses thereof, to cause the first memory means to output stored color gradation corrected data located at the respective memory addresses and average calculating means for receiving the color gradation corrected data from the first memory means and calculating averages of the three kinds of color gradation corrected data.

2. A color correction system according to claim 1, wherein said second memory means consecutively outputs said first to third coordinate correction data in response to first to third timings, said adding means consecutively receives and adds said upper n bits data of said first to third color gradation input data and said first to third coordinate correction data output from said second memory means and consecutively outputs same to said first memory means as a memory address thereof, to consecutively cause the output of said stored color gradation corrected data, and said average calculating means consecutively receives said color gradation corrected data means and calculates said averages in response to first to third timings different from said first to third timings.

3. A color correction system according to claim 2, wherein said adding means comprises first to third adding means receiving the corresponding upper bits of said three kinds of color input data, respectively, and receiving the corresponding output data from said second memory means, said second memory means comprises a first timing signal generating means for generating said first to third timing signals and a second memory for storing said coordinate correction data, and said average calculating means comprise first to fourth data holding means, a second timing generating means for generating said different first to third timing signals, and a fourth adding means receiving data output from said first to fourth data holding means and adding same.

4. A color correction system according to claim 3, wherein said first to fourth adding means comprise first to fourth adding circuits, respectively, said first to fourth data holding means comprise first fourth registers, respectively, and said fourth adding means comprises a fourth adding circuit.

5. A color correction system according to claim 3, wherein said first memory means has a capacity of at least $2^{3 \times n} \times 3$ bytes, and said second memory means has a capacity of at least $2^{(m-n) \times 3}$ bytes.

6. A color correction system according to claim 5, wherein said first memory means comprises a read-only-memory, and said second memory means comprises another read-only-memory.

7. A color correction system according to claim 6, wherein said first and second memory means are incorporated as a single memory means.

8. A color correction system according to claim 1, wherein said three kinds of color gradation data are cyan, magenta and yellow, which are three fundamental color elements, respectively.

9. A color correction system according to claim 1, wherein said three kinds of color gradation data are red, green and blue, which are three fundamental light elements, respectively.

10. A method of correcting three kinds of color gradation input data, each having an m bit length, to produce three corresponding kinds of corrected color gradation data each having an m bit length, comprising the steps of: calculating corrected color gradation data having an m bit length; storing the most significant n bits of the calculated corrected color gradation data in a first memory means in three-dimensional coordinates, where m is greater than n; storing the least significant (m−n) bits of the corrected color gradation data as coordinate correction data in a second memory means, the coordinate correction data being for determining spatial location of said three-dimensional coordinates and for determining a number of times said spatial location is to be selected; obtaining coordinate correction data from the second memory means for each of the three kinds of color gradation input data on the basis of the least significant (m−n) bits of color gradation input data in response to first to third operation timings; adding the respective most significant n bits of each of the three types of color gradation input data to corresponding coordinate correction data; outputting calculated color gradation corrected data from three-dimensional coordinates defined by the corrected coordinates; and calculating averages of the output color gradation corrected data.

11. A method of correcting three kinds of color gradation input data according to claim 10, wherein said three kinds of color gradation data are cyan, magenta and yellow, which are three fundamental color elements, respectively.

12. A method of correcting three kinds of color gradation input data according to claim 10, wherein said three kinds of color gradation data are red, green and blue, which are three fundamental light elements, respectively.

13. A method for correcting color gradation data having an m bit length for each of three colors, comprising the steps of: calculating $2^n$ corrected color gradation data words each having an m bit length for each of the three colors, wherein n<m; storing the corrected color gradation data words in a first memory means so that the data words are arranged in a three-dimensional coordinate space; determining coordinate correction data from the least significant m−n bits of color gradation data input data words each having an m bit length for each of the three colors, the coordinate correction data for determining a spatial location of the corrected color gradation data words in the three-dimensional coordinate space in the first memory means and for determining a number of times that the spatial location is to be selected; reading out the stored corrected color gradation data words $2^{m-n}$ times, wherein each stored corrected color gradation data word is selected as a function of the most significant n bits of each color gradation data input word and the coordinate correction data associated therewith, and wherein the number of times each stored corrected color gradation word is selected is a function of the coordinate correction data; and averaging the read-out stored corrected color gradation data words to produce respective corrected color gradation output data words each having an m bit length for each of the three colors.

14. A method according to claim 13, wherein the color gradation data represent cyan, magenta and yellow.

15. A method according to claim 13, wherein the color gradation data represent red, green and blue.

16. A system for correcting color gradation data having an m bit length for each of three colors, comprising: means for storing previously determined $2^n$ corrected color gradation data words each having an m bit length for each of three colors, wherein n<m, the corrected color gradation data words being arranged in a three-dimensional coordinate space; means for determining coordinate correction data from the least significant m−n bits of color gradation data input words each having an m bit length for each of three colors, the coordinate correction data being for determining a spatial location of the corrected color gradation data words in said three-dimensional coordinate space and for determining a number of times that the spatial location is to be selected; means for reading out the stored corrected color gradation data words $2^{m-n}$ times, wherein each stored corrected color gradation data word is selected as a function of the most significant n bits of each color gradation data input word and the coordinate correction data associated therewith, and wherein the number of times each stored corrected color gradation word is selected is a function of the coordinate correction data; and means for averaging the read-out stored corrected color gradation data words to produce a respective corrected color gradation output data word of m bits for each of the three colors.

17. A system according to claim 16, wherein the means for storing comprises a first read-only memory.

18. A system according to claim 17, wherein the means for determining the coordinate correction data comprises a second read-only memory addressed by the m−n lower bits.

19. A system according to claim 16, wherein the color gradation data represent cyan, magenta and yellow.

20. A system according to claim 16, wherein the color gradation data represent red, green and blue.

21. A system according to claim 16, wherein the means for averaging comprises means for adding the read-out words and shifting the added result m−n places to the right whereby the corrected color gradation data words are obtained only by adding.

* * * * *